United States Patent
Fang et al.

(10) Patent No.: US 12,431,784 B2
(45) Date of Patent: Sep. 30, 2025

(54) CONTROLLER FOR POWER SUPPLY DEVICE

(71) Applicant: Power Forest Technology Corporation, Hsinchu County (TW)

(72) Inventors: Kuan-Chun Fang, Hsinchu County (TW); Yu-Chao Lin, Hsinchu (TW); Jenn-Hwa Shyu, Hsinchu County (TW); Ting-Ching Hsu, Hsinchu County (TW); Chien-Wei Kuan, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 231 days.

(21) Appl. No.: 18/365,246

(22) Filed: Aug. 4, 2023

(65) Prior Publication Data
US 2024/0356426 A1    Oct. 24, 2024

Related U.S. Application Data

(60) Provisional application No. 63/461,575, filed on Apr. 24, 2023.

(30) Foreign Application Priority Data

Jul. 5, 2023   (TW) ................ 112125071

(51) Int. Cl.
 *H02M 1/00*   (2007.01)
(52) U.S. Cl.
 CPC ................. *H02M 1/0012* (2021.05)
(58) Field of Classification Search
 CPC ...... H02M 1/0012; G11C 17/14; G11C 16/06; G11C 5/14; G06F 13/00; G06F 1/26
 See application file for complete search history.

(56) References Cited

U.S. PATENT DOCUMENTS 8,542,059 B2   9/2013 Tejada et al.
9,230,613 B2 * 1/2016 Batt .................. G11C 5/143
(Continued)

FOREIGN PATENT DOCUMENTS

TW   1340979   4/2011
TW   1542993   7/2016
(Continued)

OTHER PUBLICATIONS

"Office Action of Taiwan Counterpart Application", issued on May 22, 2024, p. 1-p. 8.

*Primary Examiner* — Thienvu V Tran
*Assistant Examiner* — Yahveh Comas Torres
(74) *Attorney, Agent, or Firm* — JCIPRNET

(57) ABSTRACT

A controller for a power supply device includes a transmission terminal, first and second memory circuits, a determining circuit, and a control circuit. The determining circuit generates a first mode signal when an input voltage value is lower than a reference voltage value and generates a second mode signal when the input voltage value is greater than or equal to the reference voltage value. The control circuit enters a first mode and a second mode in response to the first mode signal and the second mode signal, respectively. The control circuit writes a control parameter from the transmission terminal into the first memory circuit in the first mode and uses the control parameter in the second mode to test the power supply device. When the control parameter meets an expected function of the power supply device, the control circuit writes the control parameter into the second memory circuit.

9 Claims, 2 Drawing Sheets

(56) References Cited

U.S. PATENT DOCUMENTS

| 10,896,808 | B2* | 1/2021 | Benjamin | H02H 9/02 |
| 11,430,535 | B2* | 8/2022 | Kawashima | G11C 29/46 |
| 2007/0016337 | A1* | 1/2007 | Lwagami | B60R 16/03 |
| | | | | 701/1 |
| 2020/0402603 | A1* | 12/2020 | Kawashima | G11C 29/006 |

FOREIGN PATENT DOCUMENTS

| TW | 202022919 | 6/2020 |
| TW | 1761857 | 4/2022 |
| TW | M650996 | 2/2024 |

* cited by examiner

CONTROLLER FOR POWER SUPPLY DEVICE

CROSS-REFERENCE TO RELATED APPLICATION

This application claims the priority benefit of U.S. provisional application Ser. No. 63/461,575, filed on Apr. 24, 2023, and Taiwan application serial no. 112125071, filed on Jul. 5, 2023. The entirety of each of the above-mentioned patent applications is hereby incorporated by reference herein and made a part of this specification.

BACKGROUND

Technical Field

The disclosure relates to a controller, and in particular, relates to a controller for a power supply device.

Description of Related Art

A currently-available power supply device may be operated based on control parameters. Generally, the control parameters may be written into a one-time programmable (OTP) memory circuit.

It should be noted that based on different applications or usage occasions, the power supply device may have different expected functions, and different expected functions may correspond to different control parameters. This means that the control parameters are required to be adjusted to match the expected functions of different applications or use occasions. However, when the control parameter written into the OTP memory circuit is tested and does not meet the expected function, an engineer needs to modify the OTP memory circuit. The above modification is, for example, to perform an engineering change order (ECO).

SUMMARY

The disclosure provides a controller for a power supply device capable of receiving control parameters multiple times and testing different control parameters that are received.

The disclosure provides a controller for a power supply device. The controller includes a power input terminal, a transmission terminal, a first memory circuit, a second memory circuit, a determining circuit, and a control circuit. The determining circuit is coupled to the power input terminal. The determining circuit determines an input voltage value at the power input terminal. When the input voltage value is lower than a reference voltage value, the determining circuit generates a first mode signal. When the input voltage value is greater than or equal to the reference voltage value, the determining circuit generates a second mode signal. The control circuit is coupled to the determining circuit, the first memory circuit, the second memory circuit, and the transmission terminal. The control circuit enters a first mode in response to the first mode signal and enters a second mode in response to the second mode signal. In the first mode, the control circuit writes a first control parameter from the transmission terminal into the first memory circuit. In the second mode, the control circuit uses the first control parameter stored in the first memory circuit to test the power supply device and writes the first control parameter into the second memory circuit when the first control parameter meets an expected function of the power supply device.

To sum up, in the first mode, the control circuit first writes the first control parameter from the transmission terminal into the first memory circuit. In the second mode, the control circuit uses the first control parameter stored in the first memory circuit to test the power supply device. When the first control parameter meets the expected function of the power supply device, the control circuit writes the first control parameter into the second memory circuit. The control circuit is allowed to perform multiple programming operations on the first memory circuit. In this way, the controller may receive control parameters multiple times and test different control parameters that are received.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some embodiments of the disclosure will be described in detail with reference to the accompanying drawings. For the referenced reference symbols in the following description, when the same reference symbols appear in different drawings, they will be regarded as the same or similar components. These embodiments are only a part of the disclosure, and do not reveal all possible implementation modes of the disclosure. Rather, these embodiments are only examples within the scope of the patent application of the disclosure.

Figure 1:
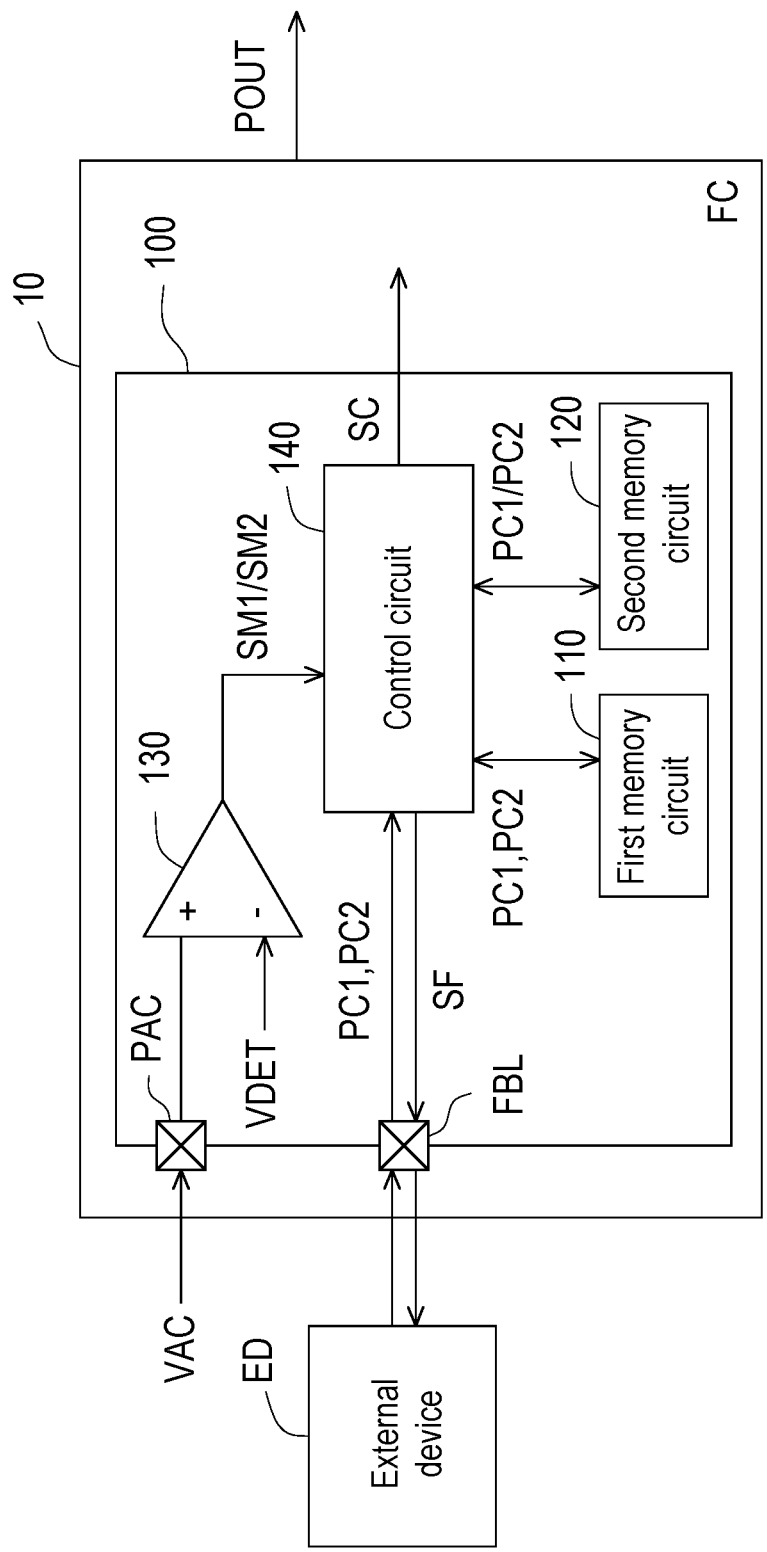
FIG. 1 is a schematic diagram of a power supply device according to an embodiment of the disclosure.

With reference to FIG. 1. FIG. 1 is a schematic diagram of a power supply device according to an embodiment of the disclosure. In this embodiment, a power supply device 10 includes a controller 100. The power supply device 10 operates in response to a control parameter in the controller 100. Taking this embodiment as an example, the power supply device 10 receives an input voltage value VAC and provides an output power POUT according to the input voltage value VAC and the control parameter. The power supply device 10 may be a power chip or a power converter (which is not limited by the disclosure).

In this embodiment, the controller 100 includes a power input terminal PAC, a transmission terminal FBL, a first memory circuit 110, a second memory circuit 120, a determining circuit 130, and a control circuit 140. The determining circuit 130 is coupled to the power input terminal PAC. The determining circuit 130 determines the input voltage value VAC at the power input terminal PAC. The determining circuit 130 provides one of a first mode signal SM1 and a second mode signal SM2 according to the input voltage value VAC. To be specific, the determining circuit 130 compares the input voltage value VAC with a reference voltage value VDET. When the input voltage value VAC is lower than the reference voltage value VDET, the determining circuit 130 generates the first mode signal SM1. When the input voltage value VAC is greater than or equal to the reference voltage value VDET, the determining circuit 130 generates the second mode signal SM2.

In this embodiment, the control circuit 140 is coupled to the determining circuit 130, the first memory circuit 110, the second memory circuit 120, and the transmission terminal FBL. The control circuit 140 enters a first mode in response to the first mode signal SM1 and enters a second mode in response to the second mode signal SM2. The first mode is, for example, a programming mode. The second mode is, for example, a normal mode. In the first mode, the control circuit 140 writes a control parameter PC1 from the transmission terminal FBL into the first memory circuit 110. In the second mode, the control circuit 140 uses the control parameter PC1 stored in the first memory circuit 110 to test the power supply device 10. In other words, in the second mode, the power supply device 10 performs an operation test based on the control parameter PC1 stored in the first memory circuit 110. In the second mode, when the control parameter PC1 meets an expected function FC of the power supply device 10, the control circuit 140 writes the control parameter PC1 into the second memory circuit 120. The expected function FC is, for example, at least one of an expected output voltage value, an output current value, output power, and efficiency of the power supply device 10.

It should be noted that the control circuit 140 first writes the control parameter PC1 into the first memory circuit 110 in the first mode. The control circuit 140 uses the control parameter PC1 stored in the first memory circuit 110 to test the power supply device 10 in the second mode. When the control parameter PC1 meets the expected function FC of the power supply device 10, the control circuit 140 writes the control parameter PC1 into the second memory circuit 120. The control circuit 140 is allowed to perform multiple programming operations on the first memory circuit 110. In this way, the controller 100 may receive control parameters multiple times and test different control parameters that are received.

In this embodiment, the first memory circuit 110 is any form of a multiple-times programmable (MTP) memory circuit. The second memory circuit 120 is a one-time programmable (OTP) memory circuit. The second memory circuit 120 is, for example, a read only memory (ROM) circuit or a fuse circuit.

It should be noted that compared with a currently-available power supply device, the control circuit 140 of the power supply device 10 of this embodiment may perform unlimited write operations of control parameters on the first memory circuit 110. In other words, the controller 100 is capable of performing unlimited tests of different control parameters. Even if the control parameter PC1 does not meet the expected function FC of the power supply device 10, the control circuit 140 may write another control parameter into the first memory circuit 110 to perform another test. In this embodiment, no modification such as an engineering change order (ECO) is required to be performed on the second memory circuit 120. The controller 100 is suitable for testing a plurality of different control parameters. In this way, test convenience of the controller 100 may be greatly improved.

In this embodiment, the transmission terminal FBL has different purposes in different modes. In the first mode, the transmission terminal FBL is switched to a parameter receiving terminal to receive the control parameter PC1. Taking this embodiment as an example, the transmission terminal FBL receives the control parameter PC1 from an external device ED in the first mode. The control circuit 140 receives the control parameter PC1 and stores the control parameter PC1 into the first memory circuit 110. In some embodiments, the first memory circuit 110 is coupled to the transmission terminal FBL. The control circuit 140 controls the first memory circuit 110 to receive the control parameter PC1 and store the control parameter PC1 in the first mode.

In this embodiment, in the second mode, the control circuit 140 reads the control parameter PC1 stored in the first memory circuit 110 and generates a control signal SC corresponding to the control parameter PC1 according to the control parameter PC1. The control circuit 140 uses the control signal SC for testing. The control signal SC includes at least one of a switch signal for controlling a power switch in the power supply device 10, a synchronous rectification signal of a synchronous rectification switch, and a reference signal. The reference signal may be a threshold required for over-voltage protection, over-current protection, and over-temperature protection.

After testing, if the control parameter PC1 meets the expected function FC of the power supply device 10, it means that the control parameter PC1 is suitable for the power supply device 10. Therefore, the control circuit 140 writes the control parameter PC1 into the second memory circuit 120. In subsequent operations, the control circuit 140 reads the control parameter PC1 stored in the second memory circuit 120 to generate the control signal SC to control the power supply device 10.

In this embodiment, the external device ED may use any form of a data transmission interface to be connected to the transmission terminal FBL. The data transmission interface is, for example, a universal asynchronous receiver/transmitter (UART) or a universal serial bus (USB). In the second mode, the transmission terminal FBL is switched to an application terminal of the power supply device 10. For example, the application terminal may be a data feedback terminal. Taking the data feedback terminal as an example, the power supply device 10 may feed back test data to the external device ED through the transmission terminal FBL.

In this embodiment, the external device ED may be an electronic device, such as a test host, a tablet computer, a notebook computer, or a desktop computer, etc., capable of providing control parameters.

In this embodiment, the determining circuit 130 includes a first input terminal, a second input terminal, and an output terminal. The first input terminal is coupled to the power input terminal PAC. The first input terminal receives the input voltage value VAC at the power input terminal PAC. The second input terminal receives the reference voltage value VDET. The output terminal is coupled to the control circuit 140. The output terminal is configured to output one of the first mode signal SM1 and the second mode signal SM2. In this embodiment, the determining circuit 130 may be implemented by a comparator or an operational amplifier.

In this embodiment, the control circuit 140 is, for example, a central processing unit (CPU), a programmable microprocessor for general or special use, a digital signal processor (DSP), a programmable controller, an application specific integrated circuit (ASIC), a programmable logic device (PLD), other similar devices, or a combination of the foregoing devices, which may load and execute computer programs.

Figure 2:
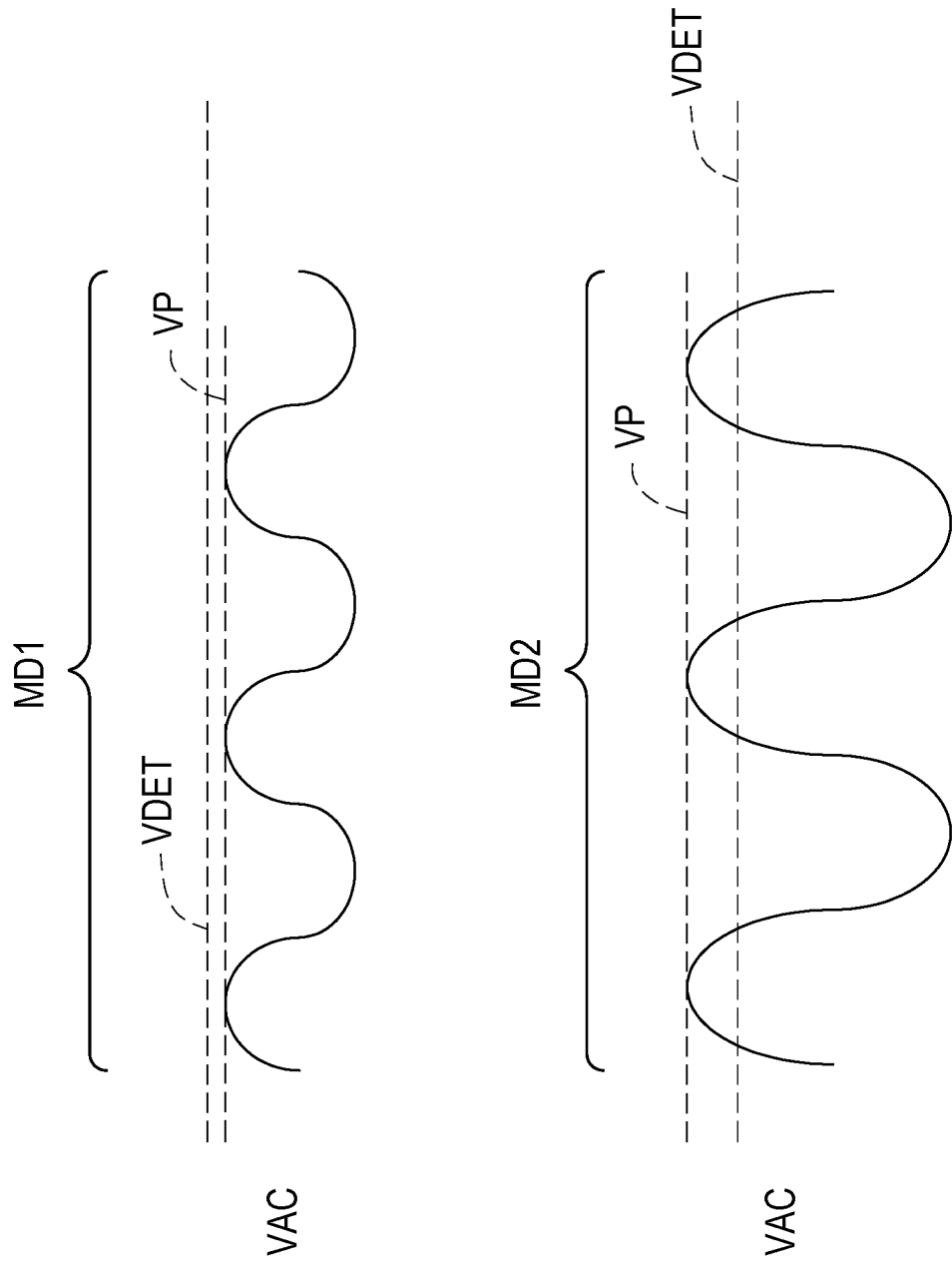
FIG. 2 is a schematic diagram of an input voltage value according to an embodiment of the disclosure.

With reference to FIG. 1 and FIG. 2, FIG. 2 is a schematic diagram of an input voltage value according to an embodiment of the disclosure. In this embodiment, the determining circuit 130 determines the input voltage value VAC at the power input terminal PAC. The determining circuit 130 compares a peak value VP of the input voltage value VAC with the reference voltage value VDET. When the peak value VP of the input voltage value VAC is lower than the reference voltage value VDET, the determining circuit 130 generates the first mode signal SM1. Therefore, the control circuit 140 enters the first mode MD1. On the other hand, when the peak value VP of the input voltage value VAC is greater than or equal to the reference voltage value VDET, the determining circuit 130 generates the second mode signal SM2. Therefore, the control circuit 140 enters the second mode MD2.

Taking this embodiment as an example, if the control circuit 140 is to enter the first mode MD1, an engineer may apply a first voltage signal to the power input terminal PAC. The peak value VP of the input voltage value VAC of the first voltage signal is lower than the reference voltage value VDET. Therefore, the determining circuit 130 generates the first mode signal SM1. The control circuit 140 enters the first mode MD1 in response to the first mode signal SM1. In the first mode MD1, if the control circuit 140 receives the control parameter PC1 through the transmission terminal FBL, the control circuit 140 may write the control parameter PC1 into the first memory circuit 110. In the first mode MD1, if the control circuit 140 does not receive the control parameter PC1, the control circuit 140 may wait until the control parameter PC1 is received. The first voltage signal may be a direct current (DC) voltage signal or an alternating current (AC) voltage signal.

When the first memory circuit 110 stores the control parameter PC1, the engineer may apply a second voltage signal to the power input terminal PAC. The second voltage signal may be a DC voltage signal or an AC voltage signal. The second voltage signal may be, for example, mains electric power. The peak value VP of the input voltage value VAC of the second voltage signal is greater than the reference voltage value VDET. Therefore, the determining circuit 130 generates the second mode signal SM2. The control circuit 140 enters the second mode MD2 in response to the second mode signal SM2. In the second mode MD2, the control circuit 140 uses the control parameter PC1 stored in the first memory circuit 110 to test the power supply device 10. After testing, when the control parameter PC1 meets the expected function FC of the power supply device 10, the control parameter PC1 may be an optimal parameter of the power supply device 10. The control circuit 140 feeds back a test result SF to the external device ED through the transmission terminal FBL. In addition, in the second mode MD2, after testing is completed, the control circuit 140 writes the control parameter PC1 into the second memory circuit 120. Therefore, after leaving the factory, the power supply device 10 operates based on the control parameter PC1 stored in the second memory circuit 120. In other words, after leaving the factory, the control circuit 140 operates in the second mode MD2.

On the other hand, in the second mode MD2, when the control parameter PC1 does not meet the expected function FC of the power supply device 10, the control parameter PC1 is not the optimal parameter of the power supply device 10. The control circuit 140 feeds back the above test result SF to the external device ED through the transmission terminal FBL. Therefore, the engineer may learn that the control parameter has to be adjusted. The engineer applies the first voltage signal to the power input terminal PAC. Therefore, the controller 100 is controlled to enter the first mode MD1. In the first mode MD1, the external device ED provides a control parameter PC2 to the transmission terminal FBL. The control circuit 140 receives the control parameter PC2 from the transmission terminal FBL and writes the control parameter PC2 into the first memory circuit 110. Next, the engineer applies a second voltage signal to the power input terminal PAC to make the controller 100 enter the second mode MD2.

In the second mode MD2, the control circuit 140 reads the control parameter PC2 stored in the first memory circuit 110 and generates a control signal SC corresponding to the control parameter PC2 according to the control parameter PC2. The control circuit 140 uses the control signal SC corresponding to the control parameter PC2 for testing. When the control parameter PC2 stored in the first memory circuit 110 meets the expected function FC of the power supply device 10, the control parameter PC2 is written into the second memory circuit 120. Therefore, after leaving the factory, the power supply device 10 operates based on the control parameter PC2 stored in the second memory circuit 120.

In view of the foregoing, the control circuit first writes the first control parameter from the transmission terminal into the first memory circuit in the first mode. In the second mode, the control circuit uses the first control parameter stored in the first memory circuit to test the power supply device. When the first control parameter meets the expected function of the power supply device, the control circuit writes the first control parameter into the second memory circuit. The control circuit is allowed to perform multiple programming operations on the first memory circuit. In this way, the controller may receive control parameters multiple times and test different control parameters that are received. The controller is suitable for multiple tests of different control parameters. The test convenience of the controller may be greatly improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A controller for a power supply device, comprising:
a power input terminal;
a transmission terminal;
a first memory circuit;
a second memory circuit, wherein the second memory circuit is a one-time programmable memory circuit;
a determining circuit coupled to the power input terminal, configured to determine an input voltage value at the power input terminal, generating a first mode signal when the input voltage value is lower than a reference voltage value, and generating a second mode signal when the input voltage value is greater than or equal to the reference voltage value; and
a control circuit coupled to the determining circuit, the first memory circuit, the second memory circuit, and the transmission terminal, configured to enter a first mode in response to the first mode signal and enter a second mode in response to the second mode signal,
wherein in the first mode, the control circuit writes a first control parameter from the transmission terminal into the first memory circuit, and
in the second mode, the control circuit uses the first control parameter stored in the first memory circuit to test the power supply device and writes the first control parameter into the second memory circuit when the first control parameter meets an expected function of the power supply device.

2. The controller according to claim 1, wherein the first memory circuit is a multiple-time programmable memory circuit.

3. The controller according to claim 1, wherein
when a peak value of the input voltage value is lower than the reference voltage value, the determining circuit generates the first mode signal, and
when the peak value of the input voltage value is greater than or equal to the reference voltage value, the determining circuit generates the second mode signal.

4. The controller according to claim 1, wherein the transmission terminal is switched to a parameter receiving terminal in the first mode.

5. The controller according to claim 1, wherein the transmission terminal receives the first control parameter from an external device in the first mode.

6. The controller according to claim 1, wherein the transmission terminal is switched to an application terminal of the power supply device in the second mode.

7. The controller according to claim 1, wherein in the second mode, the controller is controlled to enter the first mode when the first control parameter does not meet the expected function of the power supply device.

8. The controller according to claim 7, wherein in the first mode, the control circuit receives a second control parameter from the transmission terminal and writes the second control parameter into the first memory circuit.

9. The controller according to claim 8, wherein in the second mode, when the second control parameter stored in the first memory circuit meets the expected function of the power supply device, the second control parameter is written into the second memory circuit.

* * * * *